(12) United States Patent
Sugita et al.

(10) Patent No.: US 7,695,845 B2
(45) Date of Patent: Apr. 13, 2010

(54) FUEL CELL

(75) Inventors: Narutoshi Sugita, Wako (JP); Masaru Oda, Wako (JP); Masaaki Sakano, Wako (JP); Norimasa Kawagoe, Wako (JP); Takashi Kosaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/146,850

(22) Filed: Jun. 26, 2008

(65) Prior Publication Data
US 2009/0004535 A1    Jan. 1, 2009

(30) Foreign Application Priority Data
Jun. 28, 2007    (JP) .............................. 2007-170607

(51) Int. Cl.
*H01M 8/00* (2006.01)
*H01M 8/04* (2006.01)
*H01M 2/14* (2006.01)

(52) U.S. Cl. ............................. 429/34; 429/12; 429/26; 429/38; 429/39

(58) Field of Classification Search ................ 429/12, 429/34
See application file for complete search history.

(56) References Cited

U.S. PATENT DOCUMENTS 6,365,295 B1    4/2002  Matsukawa et al.
6,406,809 B1 *  6/2002  Fujii et al. .................... 429/34
7,070,872 B2 *  7/2006  Sugiura et al. ................ 429/26
2002/0122970 A1  9/2002  Inoue et al.
2002/0146612 A1 10/2002  Sugiura et al.
2003/0215695 A1 11/2003  Suzuki et al.
2004/0038102 A1  2/2004  Beckmann et al.
2004/0137298 A1  7/2004  Sugiura et al.

FOREIGN PATENT DOCUMENTS

JP    2000-223137    8/2000
JP    2001-155742    6/2001

OTHER PUBLICATIONS

European Office Action for Application No. 08011553.8, dated Oct. 29, 2008.

* cited by examiner

*Primary Examiner*—Jerry Lorengo
*Assistant Examiner*—Joseph V Micali
(74) *Attorney, Agent, or Firm*—Lahive & Cockfield, LLP; Anthony A. Laurentano

(57) ABSTRACT

Each of power generation units of a fuel cell according to the present invention is formed by stacking a first metal separator, a first membrane electrode assembly, a second metal separator, a second membrane electrode assembly, and a third metal separator together. The power generation unit has therein a first oxygen-containing gas flow field, a first fuel gas flow field, a second oxygen-containing gas flow field, and a second fuel gas flow field. The number of flow grooves in the first oxygen-containing gas flow field is different from that of flow grooves in the second oxygen-containing gas flow field, and the number of flow grooves in the first fuel gas flow field is different from that of flow grooves in the second fuel gas flow field.

6 Claims, 5 Drawing Sheets

FUEL CELL

BACKGROUND OF THE INVENTION

1. Field of the Invention

The present invention relates to a fuel cell comprising a power generation unit in which a first electrolyte electrode assembly is stacked on a first metal separator, a second metal separator is stacked on the first electrolyte electrode assembly, a second electrolyte electrode assembly is stacked on the second metal separator, and a third metal separator is stacked on the second electrolyte electrode assembly.

2. Description of the Related Art

For example, a solid polymer electrolyte fuel cell employs a solid polymer electrolyte membrane. The solid polymer electrolyte membrane is a polymer ion exchange membrane. In the fuel cell, an anode and a cathode each including an electrode catalyst layer and a porous carbon are provided on both sides of the solid polymer electrolyte membrane to form a membrane electrode assembly (electrolyte electrode assembly). The membrane electrode assembly is sandwiched between separators (bipolar plates) to form a unit cell. In use, normally a predetermined number of unit cells are stacked together to form a fuel cell stack.

In the fuel cell, a fuel gas flow field (reactant gas flow field) for supplying a fuel gas along an anode and an oxygen-containing gas flow field (reactant gas flow field) for supplying an oxygen-containing gas along a cathode are formed in surfaces of separators facing the anode and the cathode, respectively. Further, a coolant flow field for supplying a coolant as necessary is formed along surfaces of the separators between the separators.

In this case, the coolant flow field is provided at intervals of a certain number of unit cells for so called skip cooling. That is, in the design, the number of the coolant flow fields is decreased to reduce the overall size of the fuel cell stack in the stacking direction.

For example, in Japanese Laid-Open Patent Publication No. 2001-155742, as shown in FIG. 5, an electrode unit 2A is stacked on a separator 1A, another separator 1B is stacked on the electrode unit 2A, another electrode unit 2B is stacked on the separator 1B, and another separator 1C is stacked on the electrode unit 2B. The electrode units 2A, 2B are formed by joining a solid polymer electrolyte membrane 2a between a fuel electrode 2b and an air electrode 2c.

Each of the separators 1A, 1B has fuel gas flow channels 3a on a surface facing the fuel electrode 2b, and each of the separators 1B, 1C has oxygen-containing gas flow channels 3b on a surface facing the air electrode 2c. A coolant water supply channels 4 are provided between the separators 1A, 1C.

In the above fuel cell, the number of the fuel gas flow channels 3a in the stacking direction (direction indicated by arrow S) is identical to that of the oxygen-containing gas flow channels 3b in the stacking direction. As a result, non-power-generation areas, to which a fuel gas and an air are not supplied, are formed between the separators 1A, 1B, and between the separators 1B, 1C, into a staggered arrangement.

Accordingly, when deposited areas of electrode catalysts 6a, 7a in the electrode unit 2A and deposited areas of electrode catalysts 6b, 7b in the electrode unit 2B are defined in accordance with power-generation areas, the deposited areas of the electrode catalysts 6a, 7a and the deposited areas of the electrode catalysts 6b, 7b are formed in a staggered arrangement in the stacking direction. In this case, two different types of electrode units 2A, 2B are required, and thus, productivity thereof is decreased and is economically inefficient.

SUMMARY OF THE INVENTION

The present invention has been made to solve the problem, and an object of the present invention is to provide a fuel cell in which there is no wasted space for non power-generation, and it is possible to use one type of electrolyte electrode assembly, thereby resulting in improved productivity and economical efficiency.

According to the present invention, there is provided a fuel cell including power generation units each including at least first and second electrolyte electrode assemblies. The first electrolyte electrode assembly is stacked on a first metal separator, a second metal separator is stacked on the first electrolyte electrode assembly, the second electrolyte electrode assembly is stacked on the second metal separator, a third metal separator is stacked on the second electrolyte electrode assembly. The first and second electrolyte electrode assemblies each include a pair of electrodes and an electrolyte interposed between the electrodes. First through fourth reactant gas flow fields are formed between the first metal separator and the first electrolyte electrode assembly, between the first electrolyte electrode assembly and the second metal separator, between the second metal separator and the second electrolyte electrode assembly, and between the second electrolyte electrode assembly and the third metal separator, respectively, for flowing a predetermined reaction gas along power generation surfaces. The first through fourth reactant gas flow fields have a plurality of flow grooves. A coolant flow field is formed between the power generation units for flowing a coolant.

An electrode catalyst is deposited on the same area in each of the first and second electrolyte electrode assemblies. The number of the flow grooves in the first reactant gas flow field for flowing one reactant gas is different from that of the flow grooves in the third reactant gas flow field for flowing the one reactant gas, and the number of the flow grooves in the second reactant gas flow field for flowing another reactant gas is different from that of the flow grooves in the fourth reactant gas flow field for flowing the other reactant gas.

According to the present invention, a reactant gas such as a fuel gas and an oxygen-containing gas flows through a plurality of flow grooves in the reactant gas flow fields, and the number of the flow grooves in one reactant gas flow field is different from that of the flow grooves in another reactant gas flow field that is adjacent to the one reactant gas flow field in the stacking direction. Accordingly, in the first through third metal separators, there is no wasted space for non power-generation, and thus, efficient power generation can be achieved.

Further, since an electrode catalyst is deposited on the same area in each of the first and second electrolyte electrode assemblies, one type of electrolyte electrode assembly can be used as the first and second electrolyte electrode assemblies. As a result, reduction in the size of the entire fuel cell 10 can be achieved, and the entire fuel cell 10 can be produced economically, so as to improve productivity.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
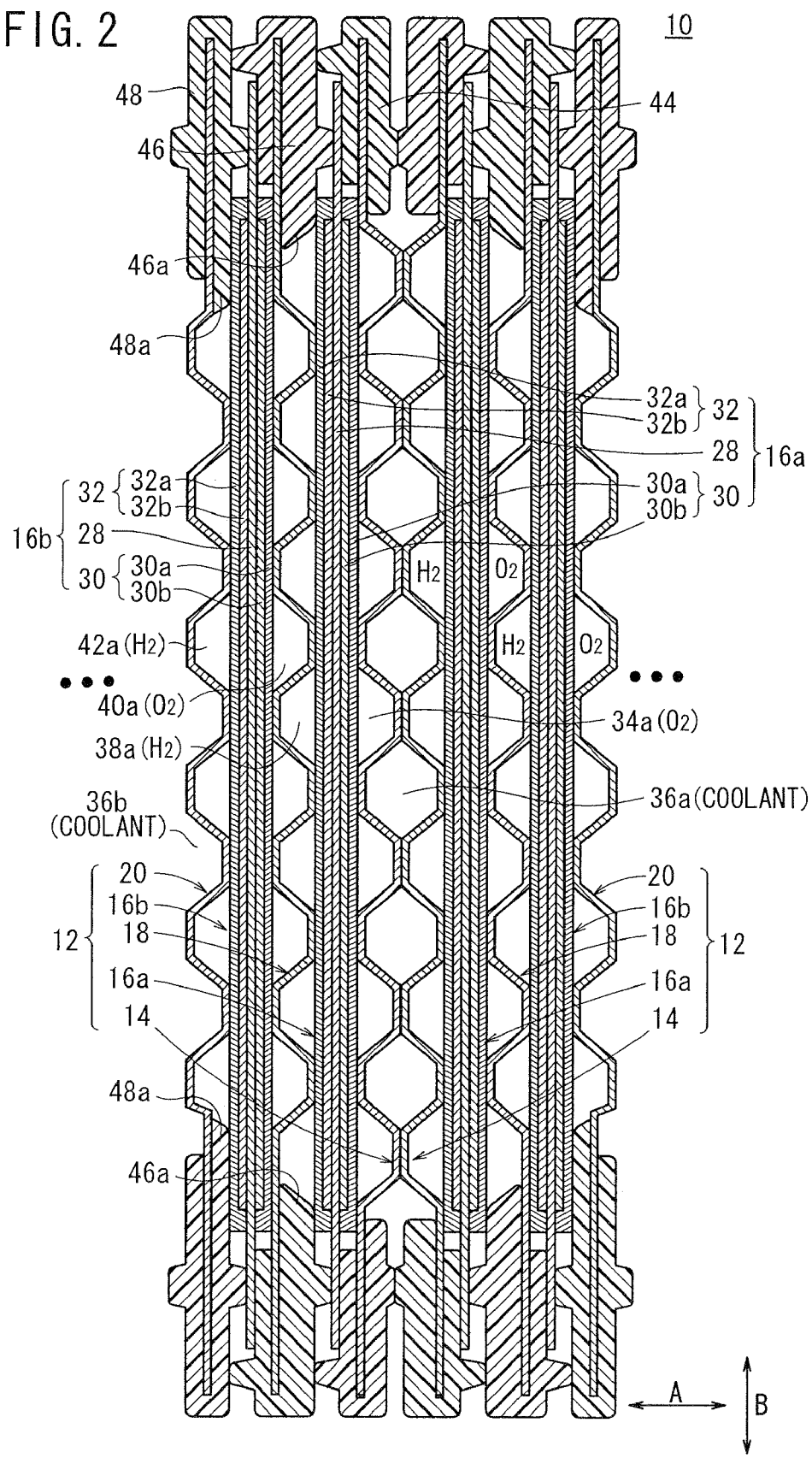
FIG. 2 is a cross sectional view showing the fuel cell, taken along a line II-II in FIG. 1.

According to an embodiment of the present invention, a fuel cell 10 is formed by stacking a plurality of power generation units 12 together in the direction indicated by arrow A (horizontal direction) with the units 12 oriented oppositely to each other (see FIG. 2). In the opposite power generation units 12, fuel gas flow fields and oxygen-containing gas flow fields are provided also oppositely to each other. In the power generation unit 12, a first membrane electrode assembly (MEA) 16a is stacked on a first metal separator 14, a second metal separator 18 is stacked on the first membrane electrode assembly (MEA) 16a, a second membrane electrode assembly (MEA) 16b is stacked on the second metal separator 18, and a third metal separator 20 is stacked on the second membrane electrode assembly (MEA) 16b.

Figure 1:
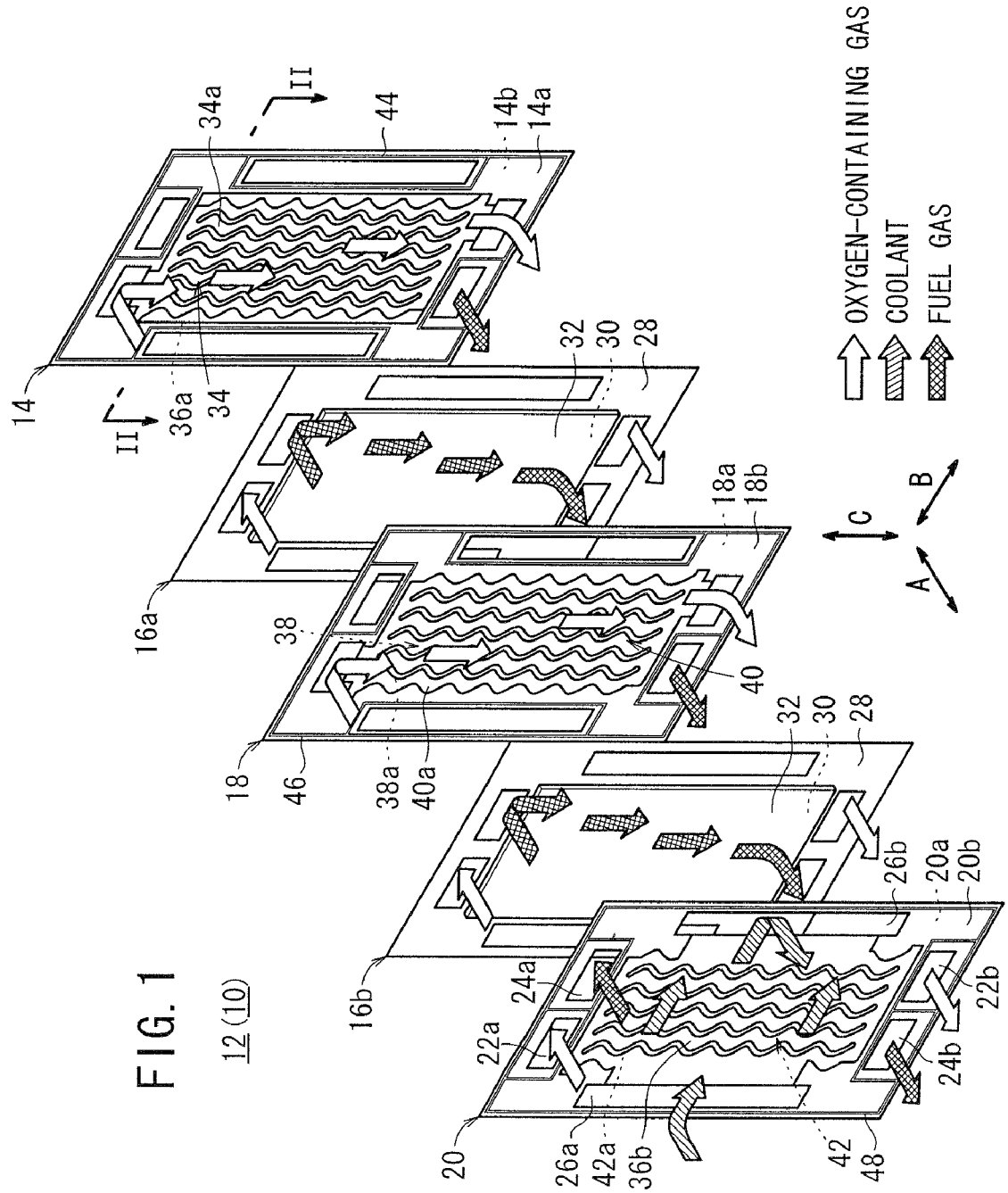
FIG. 1 is an exploded perspective view schematically showing a fuel cell according to an embodiment of the present invention.

As shown in FIG. 1, at an upper end of the power generation unit 12 in a longitudinal direction, an oxygen-containing gas supply passage 22a for supplying an oxygen-containing gas and a fuel gas supply passage 24a for supplying a fuel gas such as a hydrogen-containing gas are provided. The oxygen-containing gas supply passage 22a and the fuel gas supply passage 24a extend through the power generation unit 12 in the direction indicated by the arrow A.

At a lower end of the power generation unit 12 in the longitudinal direction, a fuel gas discharge passage 24b for discharging the fuel gas and an oxygen-containing gas discharge passage 22b for discharging the oxygen-containing gas are provided. The fuel gas discharge passage 24b and the oxygen-containing gas discharge passage 22b extend through the power generation unit 12 in the direction indicated by the arrow A.

At one end of the power generation unit 12 in a lateral direction indicated by arrow B, a coolant supply passage 26a for supplying a coolant are provided, and at the other end of the power generation unit 12 in the lateral direction, a coolant discharge passage 26b for discharging the coolant are provided. The coolant supply passage 26a and the coolant discharge passage 26b extend through the power generation unit 12 in the direction indicated by the arrow A.

Each of the first membrane electrode assembly 16a and the second membrane electrode assembly 16b includes a cathode 30, an anode 32, and a solid polymer electrolyte membrane 28 interposed between the cathode 30 and the anode 32. The solid polymer electrolyte membrane 28 is formed by impregnating a thin membrane of perfluorosulfonic acid with water, for example.

In the power generation unit 12 shown on the left in FIG. 2, the cathode 30 and the anode 32 have, respectively, gas diffusion layers 30a, 32a such as a carbon paper, and electrode catalyst layers 30b, 32b of platinum alloy supported on porous carbon particles. The carbon particles are deposited uniformly on the surfaces of the gas diffusion layers 30a, 32a. The electrode catalyst layers 30b, 32b are formed on both surfaces of the solid polymer electrolyte membrane 28, respectively. The electrode catalyst layers 30b, 32b are deposited on the same areas in each of the first and second membrane electrode assemblies 16a, 16b (i.e., each power generation area is formed on the same plane region), and practically, the same membrane electrode assembly is used as the first and second membrane electrode assemblies 16a, 16b.

The first metal separator 14 has a first oxygen-containing gas flow field (first reactant gas flow field) 34 on a surface 14a facing the first membrane electrode assembly 16a. The first oxygen-containing gas flow field 34 is connected to the oxygen-containing gas supply passage 22a and the oxygen-containing gas discharge passage 22b. The first oxygen-containing gas flow field 34 has a plurality of corrugated flow grooves 34a extending in only a direction indicated by arrow C.

A first coolant flow field 36a is formed on a surface 14b of the first metal separator 14 correspondingly to the shape of the back surface of the first oxygen-containing gas flow field 34. The first coolant flow field 36a is connected to the coolant supply passage 26a and the coolant discharge passage 26b.

Figure 3:
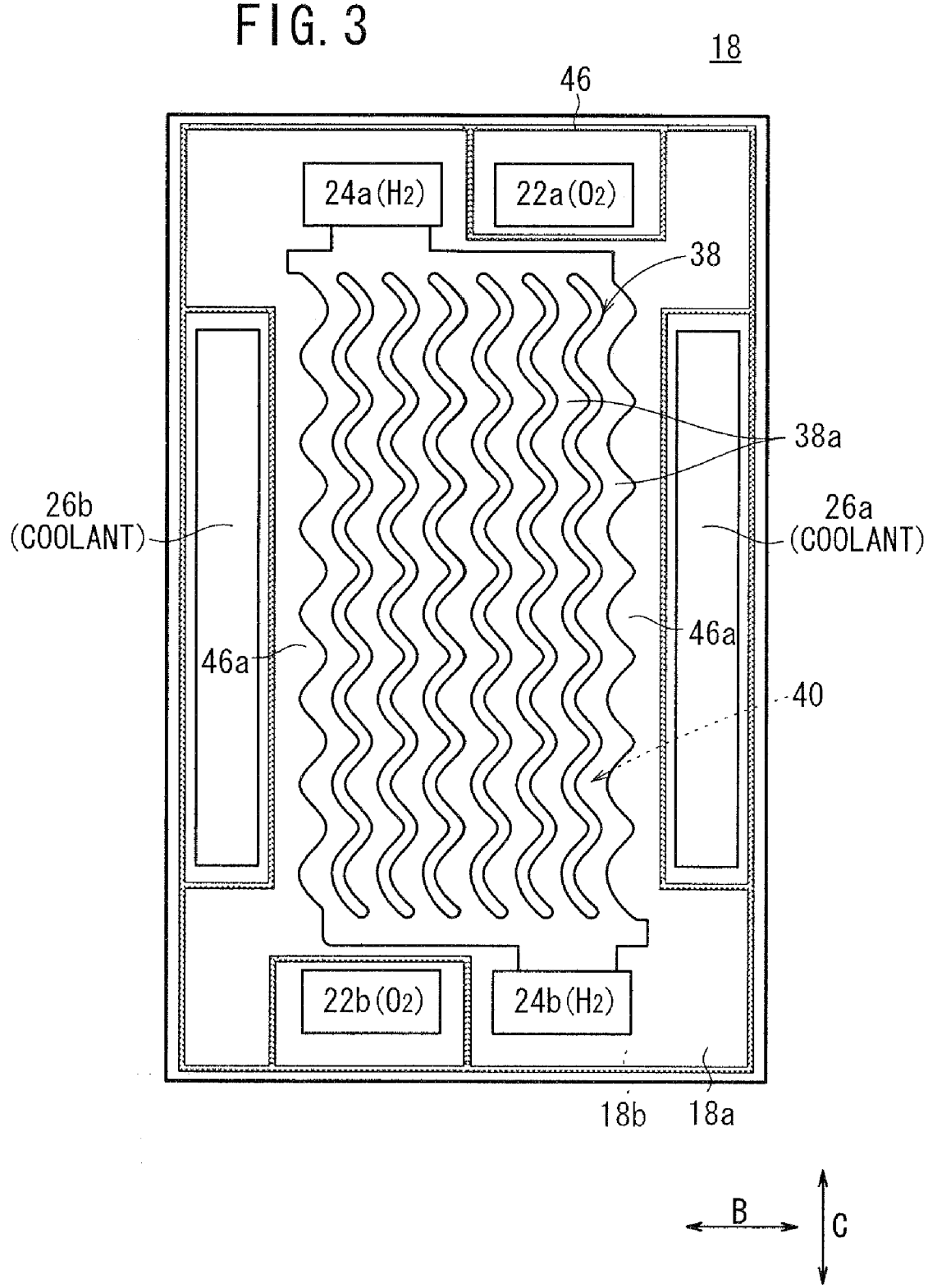
FIG. 3 is a front view showing a second metal separator of the fuel cell.

As shown in FIG. 3, the second metal separator 18 has a first fuel gas flow field (second reactant gas flow field) 38 on its surface 18a facing the first membrane electrode assembly 16a. The first fuel gas flow field 38 is connected to the fuel gas supply passage 24a and the fuel gas discharge passage 24b. The first fuel gas flow field 38 has a plurality of corrugated flow grooves 38a extending in only the direction indicated by the arrow C.

As shown in FIG. 1, the second metal separator 18 has a second oxygen-containing gas flow field (third reactant gas flow field) 40 on its surface 18b facing the second membrane electrode assembly 16b. The second oxygen-containing gas flow field 40 is connected to the oxygen-containing gas supply passage 22a and the oxygen-containing gas discharge passage 22b. The second oxygen-containing gas flow field 40 has a plurality of corrugated flow grooves 40a extending in only the direction indicated by the arrow C.

Figure 4:
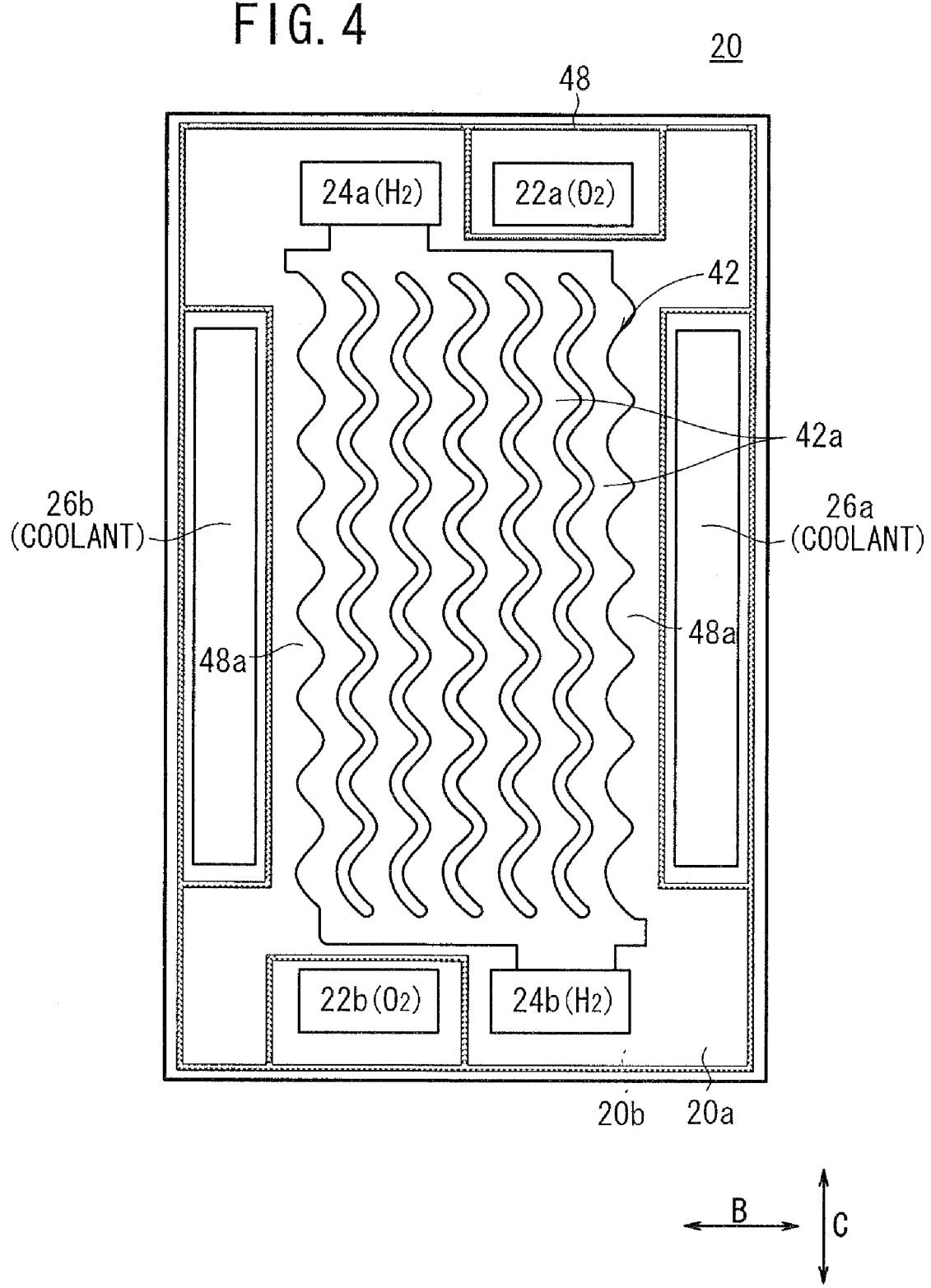
FIG. 4 is a front view showing a third metal separator of the fuel cell.
Figure 5:
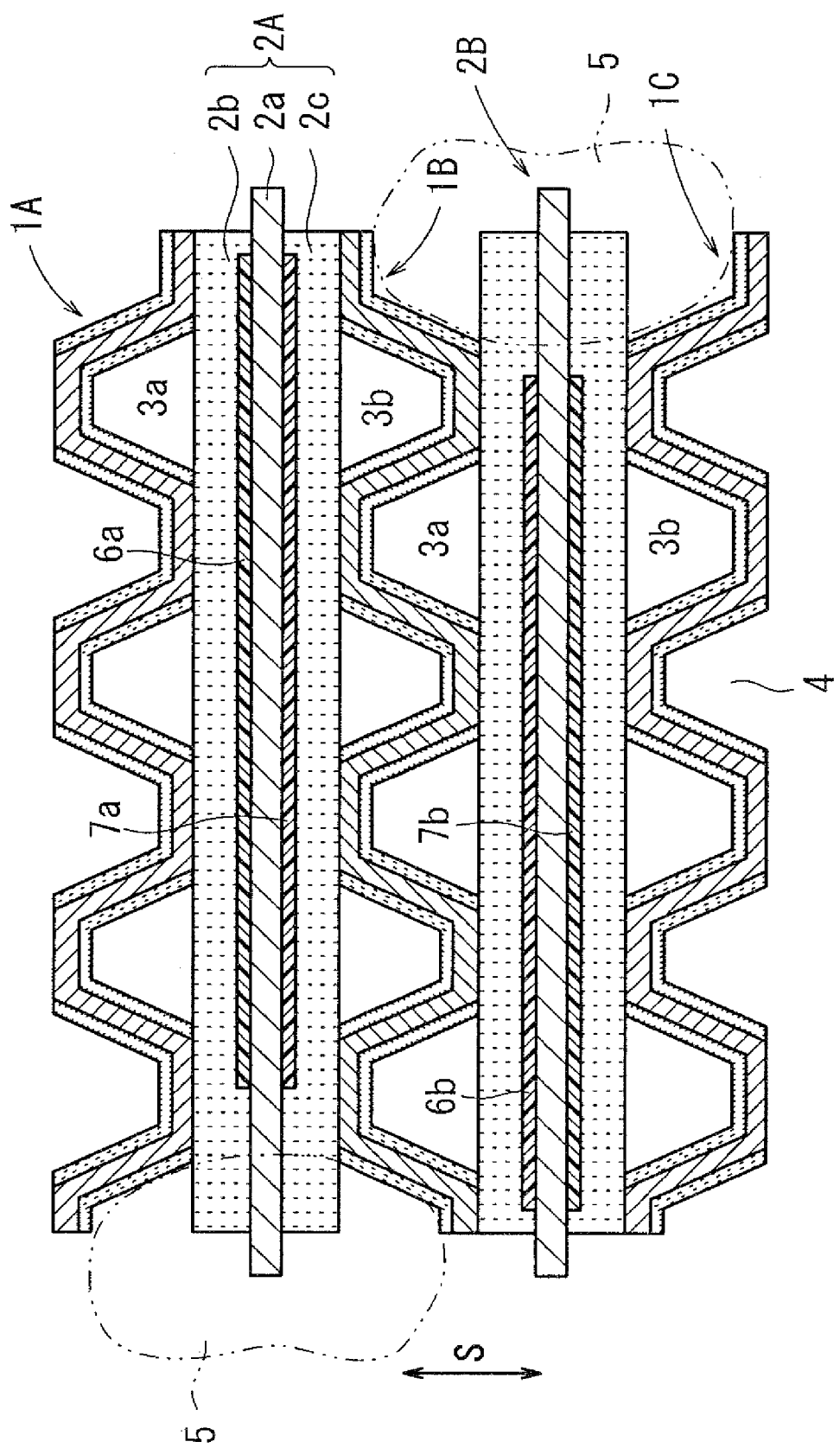
FIG. 5 is a cross sectional view showing a conventional fuel cell.

As shown in FIG. 4, the third metal separator 20 has a second fuel gas flow field (fourth reactant gas flow field) 42 on its surface 20a facing the second membrane electrode assembly 16b. The second fuel gas flow field 42 is connected to the fuel gas supply passage 24a and the fuel gas discharge passage 24b. The second fuel gas flow field 42 has a plurality of corrugated flow grooves 42a extending in only the direction indicated by the arrow C. A second coolant flow field 36b is formed on a surface 20b of the third metal separator 20 (see FIG. 1). The second coolant flow field 36b is connected to the coolant supply passage 26a and the coolant discharge passage 26b.

A first seal member 44 is formed integrally on the surfaces 14a, 14b of the first metal separator 14. On the surface 14a, the first seal member 44 allows the oxygen-containing gas to flow between the oxygen-containing gas supply passage 22a and the first oxygen-containing gas flow field 34, and between the first oxygen-containing gas flow field 34 and the oxygen-containing gas discharge passage 22b. Further, on the surface 14b, the first seal member 44 allows the coolant to flow between the coolant supply passage 26a and the first coolant flow field 36a, and between the first coolant flow field 36a and the coolant discharge passage 26b.

A second seal member 46 is formed integrally on the surfaces 18a, 18b of the second metal separator 18. As shown in FIG. 3, on the surface 18a, the second seal member 46 allows the fuel gas to flow between the fuel gas supply passage 24a and the first fuel gas flow field 38, and between the first fuel gas flow field 38 and the fuel gas discharge passage 24b. Further, on the surface 18b, the second seal member 46 allows the oxygen-containing gas to flow between the oxygen-containing gas supply passage 22a and the second oxygen-containing gas flow field 40, and between the second oxygen-containing gas flow field 40 and the oxygen-containing gas discharge passage 22b (see FIG. 1).

A third seal member 48 is formed integrally on the surfaces 20a, 20b of the third metal separator 20. As shown in FIG. 4, on the surface 20a, the third seal member 48 allows the fuel gas to flow between the fuel gas supply passage 24a and the second fuel gas flow field 42, and between the second fuel gas flow field 42 and the fuel gas discharge passage 24b. Further, on the surface 20b, the third seal member 48 allows the coolant to flow between the coolant supply passage 26a and the second coolant flow field 36b, and between the second coolant flow field 36b and the coolant discharge passage 26b.

The number of the flow grooves in the first oxygen-containing gas flow field 34 is different from that of the flow grooves in the second oxygen-containing gas flow field 40, and the number of the flow grooves in the first fuel gas flow field 38 is different from that of the flow grooves in the second fuel gas flow field 42.

Briefly describing, as shown in FIGS. 1 and 2, the first metal separator 14 has, on the surface 14a, for example, seven corrugated flow grooves 34a of the first oxygen-containing gas flow field 34. On the other hand, the second metal separator 18 has, on the surface 18b, for example, six corrugated flow grooves 40a of the second oxygen-containing gas flow field 40.

Also, as shown in FIGS. 2 and 3, the second metal separator 18 has, on the surface 18a, seven corrugated flow grooves 38a of the first fuel gas flow field 38. On the other hand, as shown in FIGS. 2 and 4, the third metal separator 20 has, on the surface 20a, six corrugated flow grooves 42a of the second fuel gas flow field 42.

Corrugated flow grooves 38a at both ends of the first fuel gas flow field 38 in the directions indicated by the arrow B are defined by a flow field forming portion 46a of the second seal member 46 (see FIGS. 2 and 3). Similarly, corrugated flow grooves 42a at both ends of the second fuel gas flow field 42 in the directions indicated by the arrow B are defined by a flow field forming portion 48a of the third seal member 48 (see FIGS. 2 and 4).

Operation of the fuel cell 10 will be described below.

Firstly, as shown in FIG. 1, in each power generation unit 12 of the fuel cell 10, the oxygen-containing gas is supplied to the oxygen-containing gas supply passage 22a, and the fuel gas such as the hydrogen-containing gas is supplied to the fuel gas supply passage 24a. Further, the coolant such as pure water or ethylene glycol is supplied to the coolant supply passage 26a.

The oxygen-containing gas is supplied to the oxygen-containing gas supply passage 22a, and flows into the first oxygen-containing gas flow field 34 of the first metal separator 14 and the second oxygen-containing gas flow field 40 of the second metal separator 18. The oxygen-containing gas flows vertically downwardly along the cathode 30 of the first membrane electrode assembly 16a, and the oxygen-containing gas flows vertically downwardly along the cathode 30 of the second membrane electrode assembly 16b.

The fuel gas is supplied through the fuel gas supply passage 24a into the first fuel gas flow field 38 of the second metal separator 18 and the second fuel gas flow field 42 of the third metal separator 20. Thus, the fuel gas flows vertically downwardly along the anodes 32 of the first membrane electrode assembly 16a and the second membrane electrode assembly 16b.

Thus, in each of the first and second membrane electrode assemblies 16a, 16b, the oxygen-containing gas supplied to the cathode 30, and the fuel gas supplied to the anode 32 are consumed in the electrochemical reactions at electrode catalyst layers 30b, 32b of the cathode 30 and the anode 32 for generating electricity.

Then, the oxygen-containing gas consumed at each cathode 30 flows into the oxygen-containing gas discharge passage 22b, and is discharged from the fuel cell 10. Likewise, the fuel gas consumed at each anode 32 flows into the fuel gas discharge passage 24b, and is discharged from the fuel cell 10.

Further, as shown in FIGS. 1 and 2, the coolant is introduced into the first and second coolant flow fields 36a, 36b formed between their respective power generation units 12. The coolant flows in the direction indicated by the arrow B (horizontal direction in FIG. 2) for cooling the second membrane electrode assembly 16b of one power generation unit 12 and the first membrane electrode assembly 16a of the other power generation unit 12. That is, after the coolant is used for skip cooling (i.e., not cooling a space between the first and second membrane electrode assembly 16a, 16b within the power generation unit 12), the coolant flows through the coolant discharge passage 26b, and is discharged from the fuel cell 10.

According to the present embodiment, as shown in FIG. 2, the number of the corrugated flow grooves 34a of the first oxygen-containing gas flow field 34 is different from the number of the corrugated flow grooves 40a of the second oxygen-containing gas flow field 40. Specifically, the first oxygen-containing gas flow field 34 has seven corrugated flow grooves 34a, and the second oxygen-containing gas flow field 40 has six corrugated flow grooves 40a.

Similarly, the number of the corrugated flow grooves 38a of the first fuel gas flow field 38 is different from that of the corrugated flow grooves 42a of the second fuel gas flow field 42. Specifically, the first fuel gas flow field 38 has seven corrugated flow grooves 38a, and the second fuel gas flow field 42 has six corrugated flow grooves 42a.

Thus, when the power generation unit 12 is formed by stacking the first metal separator 14, the first membrane electrode assembly 16a, the second metal separator 18, the second membrane electrode assembly 16b, and the third metal separator 20 together in the direction indicated by the arrow A, the power generation unit 12 has no wasted space for non power-generation. More specifically, there is no wasted space in the first through third metal separators 14, 18, 20.

Accordingly, in each power generation unit 12, the oxygen-containing gas and the fuel gas are favorably supplied to the cathodes 30 and the anodes 32 of the first and second membrane electrode assemblies 16a, 16b, and thus, efficient power generation can be achieved. Also, reduction in the size of the entire fuel cell 10 is achieved, and the entire fuel cell 10 is produced economically.

Further, as shown in FIG. 2, the oxygen-containing gas and the fuel gas are favorably supplied at both ends of the first membrane electrode assembly 16a in the direction indicated by the arrow B through the corrugated flow grooves 34a, 38a. In the second membrane electrode assembly 16b, the oxygen-containing gas and the fuel gas are favorably supplied at both ends thereof in the direction indicated by the arrow B through the corrugated flow grooves 40a, 42a and through the gas diffusion layers 30a, 32a of the cathodes 30 and the anodes 32.

Accordingly, the first and second membrane electrode assemblies 16a, 16b have the substantially same power-generation area, and then, electrode catalyst layers 30b, 32b are deposited on the same areas (same plane regions) in each membrane electrode assembly. Thus, the same structure is used as the first and second membrane electrode assemblies 16a, 16b, and accordingly, all the membrane electrode assemblies may be one type of membrane electrode assembly 16a (or 16b). Therefore, manufacturing jigs and processes for MEA is simplified so as to improve production capability, and thereby to reduce production cost.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising power generation units each including at least first and second electrolyte electrode assemblies, said first electrolyte electrode assembly being stacked on a first metal separator, a second metal separator being stacked on said first electrolyte electrode assembly, said second electrolyte electrode assembly being stacked on said second metal separator, a third metal separator being stacked on said second electrolyte electrode assembly, said first and second electrolyte electrode assemblies each including a pair of electrodes and an electrolyte interposed between said electrodes, first through fourth reactant gas flow fields being formed between said first metal separator and said first electrolyte electrode assembly, between said first electrolyte electrode assembly and said second metal separator, between said second metal separator and said second electrolyte electrode assembly, and between said second electrolyte electrode assembly and said third metal separator, respectively, for flowing a predetermined reaction gas along power generation surfaces, said first through fourth reactant gas flow fields having a plurality of flow grooves, a coolant flow field being formed between said power generation units for flowing a coolant, wherein an electrode catalyst is deposited on the same area in each of said first and second electrolyte electrode assemblies, the number of the flow grooves in said entire first reactant gas flow field for flowing one reactant gas is different from that of the flow grooves in said entire third reactant gas flow field for flowing the one reactant gas, and the number of the flow grooves in said entire second reactant gas flow field for flowing another reactant gas is different from that of the flow grooves in said entire fourth reactant gas flow field for flowing the other reactant gas.

2. A fuel cell according to claim 1, wherein said flow grooves extend in only one direction.

3. A fuel cell according to claim 2, wherein said flow grooves extend in a corrugated shape in only said one direction.

4. A fuel cell according to claim 1, wherein the number of the flow grooves in said first reactant gas flow field is larger than that of the flow grooves in said third reactant gas flow field, and the number of the flow grooves in said second reactant gas flow field is larger than that of the flow grooves in said fourth reactant gas flow field.

5. A fuel cell according to claim 4, wherein the number of the flow grooves in said first reactant gas flow field is identical to that of the flow grooves in said second reactant gas flow field, and the number of the flow grooves in said third reactant gas flow field is identical to that of the flow grooves in said fourth reactant gas flow field.

6. A fuel cell according to claim 1, wherein said power generation units are stacked together while said power generation units are oriented oppositely to each other.

* * * * *